(12) United States Patent
Kitahara

(10) Patent No.: US 7,679,071 B2
(45) Date of Patent: Mar. 16, 2010

(54) ELECTRON BEAM DRAWING APPARATUS

(75) Inventor: Hiroaki Kitahara, Saitama (JP)

(73) Assignee: Pioneer Corporation, Tokyo (JP)

( * ) Notice: Subject to any disclaimer, the term of this patent is extended or adjusted under 35 U.S.C. 154(b) by 404 days.

(21) Appl. No.: 11/630,362

(22) PCT Filed: Jun. 21, 2005

(86) PCT No.: PCT/JP2005/011346

§ 371 (c)(1),
(2), (4) Date: Feb. 5, 2007

(87) PCT Pub. No.: WO2005/124467

PCT Pub. Date: Dec. 29, 2005

(65) Prior Publication Data

US 2008/0006781 A1    Jan. 10, 2008

(30) Foreign Application Priority Data

Jun. 21, 2004    (JP)    ............................. 2004-182290

(51) Int. Cl.
*G21K 5/04*    (2006.01)
(52) U.S. Cl. .............. 250/492.3; 250/492.1; 250/492.2; 250/310; 250/442.11
(58) Field of Classification Search .............. 250/492.1, 250/492.2, 492.3, 306, 307, 310, 311, 442.11; 369/272, 110; 346/147; 428/65.3; 34/559; 318/649; 414/783
See application file for complete search history.

(56) References Cited

U.S. PATENT DOCUMENTS 3,745,341 A * 7/1973 Sakitani .................. 250/442.11

(Continued)

FOREIGN PATENT DOCUMENTS

EP    1 187 121 A2    3/2002

(Continued)

OTHER PUBLICATIONS

Wada et al, "High-Density Recording Using an Electron Beam Recorder", Jpn. J. Appl. Phys., vol. 40, (2001), pp. 1653-1660.

(Continued)

*Primary Examiner*—Nikita Wells
*Assistant Examiner*—Michael J Logie
(74) *Attorney, Agent, or Firm*—Nixon & Vanderhye, PC

(57) ABSTRACT

An example electron beam drawing apparatus includes an electron beam emitting unit which emits an electron beam, a rotary stage which rotatably supports a turntable for retaining a drawing object, and a sample stage which is supported by the turntable in a range including a rotating center of the turntable to retain an adjustment sample. A rotationally symmetrical pattern such as a concentric pattern and a radial pattern can be drawn in the drawing object by irradiating the drawing object with the electron beam during rotation of the turntable. Before the pattern is actually drawn in the drawing object, beam adjustment and rotating center adjustment are performed using an adjustment sample. The adjustment sample is retained by the sample stage, and the sample stage is supported by the turntable in the range including the rotating center of the turntable. Therefore, the beam adjustment and the rotating center adjustment can be performed using the adjustment sample supported by the turntable, and the different stage for placing the adjustment sample is not required, which allows the apparatus to be miniaturized.

18 Claims, 6 Drawing Sheets

U.S. PATENT DOCUMENTS

| | | | | |
|---|---|---|---|---|
| 4,040,089 A * | 8/1977 | Guarracini | ............... | 369/53.26 |
| 4,041,532 A * | 8/1977 | Plows et al. | ............... | 369/13.01 |
| 4,074,313 A * | 2/1978 | Reisner et al. | ........... | 369/44.39 |
| 4,930,116 A * | 5/1990 | Dil | ........................... | 369/275.1 |
| 5,193,084 A * | 3/1993 | Christiaens | ................. | 720/696 |
| 5,568,337 A * | 10/1996 | Eguchi et al. | ............ | 360/78.11 |
| 5,656,229 A * | 8/1997 | Tanimoto et al. | ............ | 264/400 |
| 5,798,999 A * | 8/1998 | Labinsky et al. | ............. | 369/266 |
| 5,930,215 A * | 7/1999 | Fite et al. | ................. | 369/53.22 |
| 6,203,968 B1 * | 3/2001 | Igarashi | ....................... | 430/320 |
| 6,246,053 B1 * | 6/2001 | Kendall et al. | ............ | 250/252.1 |
| 6,586,753 B2 * | 7/2003 | Wada | ....................... | 250/491.1 |
| 6,686,597 B2 * | 2/2004 | Kumasaka et al. | ........ | 250/492.2 |
| 6,930,961 B2 * | 8/2005 | Wada | ....................... | 369/44.13 |
| 7,095,699 B2 * | 8/2006 | Miura et al. | ................. | 369/101 |
| 7,276,692 B2 * | 10/2007 | Katsumura et al. | .......... | 250/310 |
| 7,298,678 B2 * | 11/2007 | Bryant et al. | ............. | 369/47.38 |
| 7,361,456 B2 * | 4/2008 | Tsukuda et al. | .............. | 430/321 |
| 2002/0034152 A1 * | 3/2002 | Kumasaka et al. | ........... | 369/272 |
| 2003/0071230 A1 * | 4/2003 | Wada | ....................... | 250/491.1 |
| 2004/0069952 A1 * | 4/2004 | Katsumura et al. | ........... | 250/397 |
| 2005/0099628 A1 * | 5/2005 | Kokumai | .................... | 356/401 |
| 2006/0017020 A1 * | 1/2006 | Usa et al. | ............... | 250/492.23 |
| 2006/0076514 A1 * | 4/2006 | Akeno | .................... | 250/492.22 |
| 2006/0248967 A1 * | 11/2006 | Tsukuda et al. | ............. | 73/865.9 |

FOREIGN PATENT DOCUMENTS

| | | |
|---|---|---|
| JP | 2002-367241 | 12/2002 |
| JP | 2003-36572 | 2/2003 |
| JP | 2003-036572 | 2/2003 |
| JP | 2001-164762 | 6/2004 |
| JP | 2004-164762 | 6/2004 |

OTHER PUBLICATIONS

Ogata et al, "Electron-Beam writing and its application to large and high-density diffractive optic elements", Applied Optics, vol. 33, No. 10, pp. 2032-2038, Apr. 1, 1994.

International Search Report of PCT/JP2005/011346, mailed Sep. 6, 2005.

Wada et al, "High-density recording using an electron beam recorder", Jpn. J. Appl. Phys., vol. 40, pp. 1653-1660, Oct. 30, 2000.

* cited by examiner

ELECTRON BEAM DRAWING APPARATUS

This application is the US national phase of international application PCT/JP2005/1011346, filed 21 Jun. 2005, which designated the U.S. and claims priority of JP 2004-182290, filed 21 Jun. 2004, the entire contents of each of which are hereby incorporated by reference.

TECHNICAL FIELD

The present invention relates to an electron beam drawing apparatus.

BACKGROUND TECHNIQUE

Recently, there have been developed various recording mediums in which large-capacity image/sound data and digital data can be recorded. An optical disc such as a DVD (Digital Versatile Disc) can be cited as an example of this kind of recording medium. There has also been developed a large-capacity disc such as a magnetic recording hard disc.

However, in producing a conventional master disc with a visible-range or ultraviolet-range laser beam, recording resolution is restricted by a spot diameter of a recording laser beam. In order to increase the recording density of the above-mentioned disc, it has been studied to perform the production, so-called cutting, of the master disc by a master disc producing apparatus using an electron beam, which has the spot diameter smaller than that of the visible-range or ultraviolet-range laser beam and by which the recording resolution can be improved.

In the production of the master disc, after the electron beam resist is applied onto a substrate, the electron beam is irradiated in a vacuum atmosphere. A latent image of a fine pattern is formed on the electron beam resist by the irradiation of the electron beam (electron beam exposure). A development process, a patterning process, and a resist removing process are performed to the substrate, and a fine convexoconcave pattern is formed on the substrate. Patent Documents 1 and 2 disclose a master disc producing apparatus in which the electron beam is utilized.

In the above-mentioned master disc producing apparatus, the disc substrate onto which the electron beam resist is applied is irradiated with the electron beam while rotated on a rotary stage, so that the fine pattern such as a concentric pattern and a radial pattern is drawn on the disc substrate. Therefore, before the pattern is drawn with the electron beam, it is necessary that objective lens strength and an astigmatism corrector in an electron beam optical system be previously adjusted to narrow the beam diameter. For this reason, it is necessary that a beam adjustment sample be attached in the apparatus or on the substrate. Furthermore, in order to correctly form the concentric or radial fine pattern on the disc substrate, it is necessary that a rotating center of the rotary stage be specified to match a drawing origin of the electron beam with the rotating center of the rotary stage, i.e., with a polar coordinate origin of a rotary linear motion stage system.

Non-Patent Document 1 discloses a beam diameter adjustment technique, wherein the fine-structured adjustment sample attached to a micro-adjustment stage adjacent to the turntable is matched with a substrate height, and the focus adjustment is performed by an electron microscope function possessed by the drawing apparatus of itself such that the resolution of the adjustment sample becomes the best in the electron microscope image.

Non-Patent Document 2 discloses a rotating center adjustment technique, wherein a grating is attached to a center portion of the turntable, and the turntable is rotated to adjust a position of the electron beam.

However, in the beam diameter adjustment technique disclosed in Non-Patent Document 1, because it is necessary that the adjustment sample be moved in an electron beam irradiation range during the adjustment, it is necessary to lengthen a movement distance of a radial-direction moving linear motion stage, which results in a problem that the whole drawing apparatus becomes large. In the case where the drawing apparatus has a function of applying a decelerating voltage for decelerating the electron beam to the substrate as a drawing target, usually the stage on which the adjustment sample is placed is not equipped with a function of applying the decelerating voltage. Therefore, the focal height of the electron beam is different between the substrate surface having a potential of the applied decelerating voltage and the adjustment sample having a ground potential because the decelerating voltage is not applied. Accordingly, in order to correctly perform the beam adjustment in the actual decelerating voltage applied state, decelerating voltage applying means is separately required for the adjustment sample, which results in problems such as complication of an apparatus configuration and cost increase.

On the other hand, in the rotating center adjustment technique disclosed in Non-Patent Document 2, time and effort are required because the grating is attached only in the adjustment while detachment of the grating is required in the actual drawing.

Patent Document 1; Japanese Patent Application Laid-Open No. 2002-367241

Patent Document 2: Japanese Patent Application Laid-Open No. 2003-36572

Non-Patent Document 1. JPN. J. Appl. Phys. Vol. 40, pp 1653-1660, Oct. 30, 2000, "High-Density Recording Using an Electron Beam Recorder", by Yasumitu Wada, Masahiro Katsumura, Yoshiaki Kojima, Hiroaki Kitahara, and Tetsuya Iida Non-Patent Document 2: Applied Optics, Vol. 33, No. 10, pp. 2032, April, 1994, "Electron-beam writing system and its application to large and high-density diffractive optic elements", Shiro Ogata, Masami Tada and Masahiro Yoneda

DISCLOSURE OF INVENTION

Problem to be Solved by the Invention

The above-described problem can be cited as an example of the problem to be solved by the invention. An object of the invention is to provide an electron beam drawing apparatus which can easily perform the beam adjustment and the rotating center adjustment without increasing the size of the apparatus.

Means for Solving the Problem

According to one aspect of the present invention, an electron beam drawing apparatus includes: an electron beam emitting unit which emits an electron beam; a rotary stage which rotatably supports a turntable for retaining a drawing object; and a sample stage which is supported by the turntable in a range including a rotating center of the turntable to retain an adjustment sample.

In the electron beam drawing apparatus of the invention, the drawing object is irradiated with the electron beam emitted from the electron beam emitting unit. Since the drawing object is retained by the turntable supported by the rotary stage, the drawing object is irradiated with the electron beam during the rotation of the turntable, and thereby the rotationally symmetrical pattern such as a concentric pattern and a radial pattern can be drawn on the drawing object. The drawing object includes, but not limited to, the master optical disc substrate.

The beam adjustment and the rotating center adjustment are performed before the pattern is actually drawn on the drawing object. The beam adjustment means focus adjustment of an electron beam spot formed on the drawing object. The rotating center adjustment means that the rotating center of the turntable is specified to match a drawing origin of the electron-beam with the rotating center of the turntable in order to correctly form the concentric or radial fine pattern on the disc substrate. The beam adjustment and the rotating center adjustment are performed by irradiating the electron beam on the adjustment sample. In the electron beam drawing apparatus of the invention, the adjustment sample is retained by the sample stage, and the sample stage is supported by the turntable in the range including the rotating center of the turntable. Therefore, the beam adjustment and the rotating center adjustment can be performed using the adjustment sample supported by the turntable, and the different stage for placing the adjustment sample is not required. This allows the apparatus to be miniaturized.

On one manner of the electron beam drawing apparatus of the invention further includes a sample stage support mechanism which movably supports the sample stage in a direction perpendicular to a surface in which the turntable retains the drawing object. In this manner, since the sample stage retaining the adjustment sample is movable in the direction perpendicular to the turntable surface, the sample stage is moved at a position when the sample stage is required during the adjustment and the like, and the sample stage is retracted out of the way when the sample stage is not required.

In another manner of the electron beam drawing apparatus of the invention, the sample stage support mechanism can move the sample stage below the surface at which the turntable retains the drawing object. Accordingly, after the adjustment is completed with the adjustment sample, the sample stage never interrupts the arrangement of the drawing object on the turntable by retracting the sample stage below the turntable.

In still another manner of the electron beam drawing apparatus of the invention, the turntable has a recess portion in the surface in which the turntable retains the drawing object near the rotating center, and the sample stage support mechanism is an elevating mechanism which is provided in the recess portion to raise and lower the sample stage.

In this manner, the recess portion is formed in the turntable, and the sample stage can be retracted into the recess portion by the sample stage support mechanism when the sample stage is not required.

In still another manner of the electron beam drawing apparatus of the invention, the sample stage has conductivity, the sample stage support mechanism supports the sample stage while the sample stage is in contact with the drawing object when the drawing object is retained by the turntable, and the sample stage support mechanism further includes voltage applying means for applying a voltage to the sample stage.

In this manner, since the sample stage retaining the adjustment sample also functions as the electrode for applying the voltage to the drawing object, the decelerating voltage of the electron beam or the like can be applied to the drawing object through the sample stage. Therefore, it is not necessary that the voltage applying electrode be provided independently of the sample stage, and hence the apparatus configuration can be simplified to perform the cost reduction.

In a preferred example of the electron beam drawing apparatus of the invention, the sample stage support mechanism biases the sample stage against the drawing object. Since the sample stage also functions as the voltage applying electrode, the contact between the sample stage and the drawing object can securely be maintained by appropriately biasing the sample stage against the drawing object. The sample stage is fixed to the turntable to perform the rotation motion, and hence biasing the sample stage against the drawing object particularly helps securing of electric connection during the rotation.

In another preferred example of the electron beam drawing apparatus of the invention, the adjustment sample is made of a conductive material having a fine structure in a surface thereof, the fine structure having enough flatness to reflect light. Accordingly, a sample height can be detected with an optical substrate height measuring device, and the beam adjustment can correctly be performed. since the one adjustment sample can be used for both the beam adjustment and the rotating center adjustment, it is not necessary that the different adjustment samples be separately prepared for the beam adjustment and the rotating center adjustment.

BRIEF DESCRIPTION OF THE REFERENCE NUMBER

Figure 1:
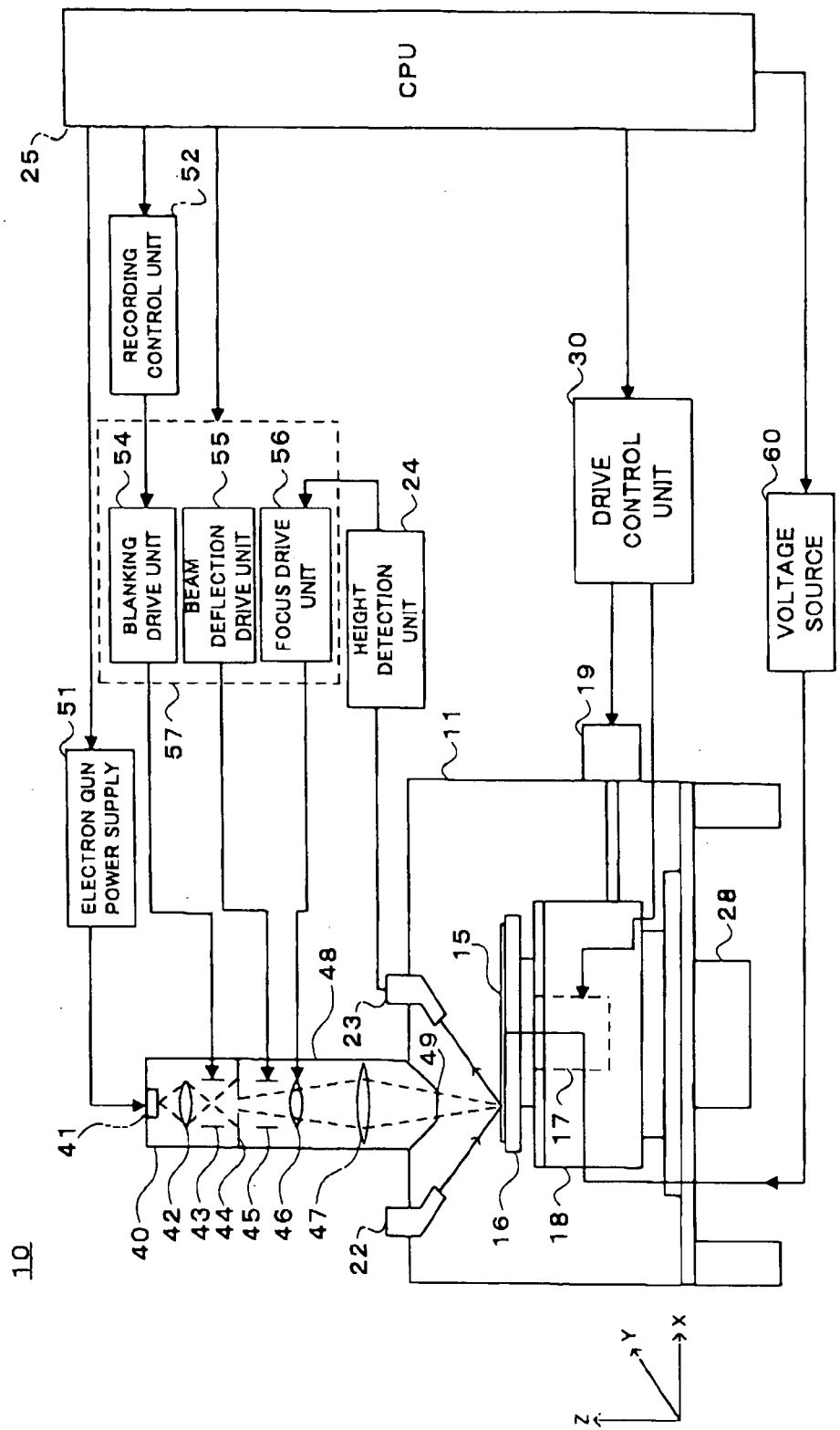
FIG. 1 is a block diagram showing a basic configuration of a master disc producing apparatus which is an embodiment of an electron beam drawing apparatus according to the invention.

10 master disc producing apparatus
11 vacuum chamber
15 disc substrate
16 turntable
17 air spindle motor
18 stage
71 adjustment sample
72 sample stage
73 sample stage support mechanism
78 center boss

DETAILED DESCRIPTION OF THE PREFERRED EMBODIMENTS

Preferred embodiments of the invention will be described below with reference to the drawings.

(Basic Configuration)

The present invention provide a rotary stage type electron beam drawing apparatus used to draw a rotationally symmetrical pattern for a master optical disc and the like. FIG. 1 is a block diagram showing a configuration of a master disc producing apparatus 10 which is of an electron beam drawing apparatus according to an embodiment of the invention.

An outline of a master disc producing process will be described below making an optical disc as an example. Because the electron beam is remarkably attenuated in the atmosphere, the electron beam is used in vacuum. Accordingly, the electron gun, the turntable on which the substrate for producing the master optical disc is placed, and the like are arranged in vacuum. For example, a silicon (Si) substrate is used to produce the master optical disc. An electron beam resist is applied onto a principal surface of the silicon substrate. The substrate onto which the electron beam resist is applied is rotated in the master disc producing apparatus 10, and the substrate is irradiated with the electron beam modulated by an information data signal to form a spiral latent image having a fine convexoconcave pattern such as a pit and a groove.

After the electron beam exposure, the substrate is taken out from the master disc producing apparatus 10, and a development process is applied to the substrate. Then, the patterning process and the resist removing process are performed to form the fine convexoconcave pattern on the substrate. A conductive film is formed on the principal surface of the substrate on which the pattern is formed, and an electroforming process is performed to produce a master optical disc (stamper).

As shown in FIG. 1, the master disc producing apparatus 10 includes a vacuum chamber 11, a drive device which drives the disc substrate arranged in the vacuum chamber 11, and an electron beam emission head 40 which includes an electron beam optical system attached into the vacuum chamber 11. An optical disc substrate 15 for master optical disc (hereinafter simply referred to as "disc substrate") is placed on a turntable 16. The turntable 16 is rotated about a rotating axis which is an axis perpendicular to the principal surface of the disc substrate by an air spindle motor 17, which is a rotational drive device for rotating the disc substrate 15. The air spindle motor 17 is accommodated in a linear motion stage 18. The linear motion stage 18 is coupled to a feed motor 19 which is a translational drive device, and the linear motion stage 18 performs translational movement of the air spindle motor 17 and turntable 16 in a predetermined direction (X-direction in FIG. 1) in a plane parallel to the principal surface of the disc substrate 15. The turntable 16 is made of a dielectric material such as ceramic, and the disc substrate 15 is retained on the turntable 16 by an electrostatic chucking mechanism (not shown).

A light source 22 and a photo detector 23 are provided in the vacuum chamber 11 to detect a height of the principal surface of the disc substrate 15, and the output of the photo detector 23 is supplied to a height detection unit 24. For example, the photo detector 23 includes a position sensor or a CCD (Charge Coupled Device). The photo detector 23 receives the light emitted from the light source 22 and reflected from the surface of the disc substrate 15, and supplies a light receiving signal to the height detection unit 24. The height detection unit 24 detects the height of the principal surface of the disc substrate 15 based on the light receiving signal.

The vacuum chamber 11 is installed through a vibration isolating table (not shown) such as an air dumper to suppress vibration transfer from the outside. A vacuum pump 28 is connected to the vacuum chamber 11 to discharge the air inside the chamber, and thereby the inside of the chamber is maintained at a predetermined degree of vacuum. A drive control unit 30 is also provided to control the air spindle motor 17 and feed motor 19. The drive control unit 30 is operated under the control of CPU 25 which controls the whole of the master disc producing apparatus 10.

An electron gun 41, a converging lens 42, blanking electrodes 43, an aperture 44, beam deflection electrodes 45, a focus adjustment lens 46 and an objective lens 47 are sequentially arranged, in this order, in the electron beam emission head 40 which emits the electron beam. The electron beam emission head 40 is attached to a ceiling surface of the vacuum chamber 11 insuch a state that an electron beam emission port 49 provided at the tip of an electron gun cylinder 48 is orientated toward a space in the vacuum chamber 11. The electron beam emission port 49 is arranged at a position close to and opposite to the principal surface of the disc substrate 15 on the turntable 16.

In the electron gun 41, a high voltage supplied from an electron gun power supply 51 is applied to a cathode (not shown) to emit the electron beam which is accelerated to, e.g., 10 KeV. The converging lens 42 converges and introduces the emitted electron beam to the aperture 44. A blanking drive unit 54 is operated based on a signal from a recording control unit 52, and controls the blanking electrodes 43 to turn on and off the electron beam. That is, the blanking drive unit 54 largely deflects the electron beam passing through the blanking electrodes 43 by applying the voltage between the blanking electrodes 43. When the electron beam is largely deflected, the electron beam does not converge into an iris hole of the aperture 44 and does not pass through the aperture 44, which causes the electron beam emission head 40 to be in an off state.

A beam deflection drive unit 55 applies the voltage to the beam deflection electrode 45 to deflect the electron beam passing through the bean deflection electrode 45 in response to a control signal from CPU 25. Therefore, the positional control of an electron beam spot with respect to the disc substrate 15 is performed. A focus lens drive unit 56 performs focus adjustment of the electron beam spot, which is irradiated on the principal surface of the disc substrate 15, based on the detection signal from the height detection unit 24. The blanking drive unit 54, the beam deflection drive unit 55 and the focus lens drive unit 56 act as a beam adjustment unit 57, and are controlled by CPU 25.

As described above, when the electron beam is incident to the resist layer formed on the disc substrate 15 at high speed during the electron beam exposure of the disc substrate 15, the electron beam passes through the resist layer, and hence the exposure amount is decreased to reduce the (exposure) sensitivity. Therefore, in the present invention, a decelerating voltage ($-V_R$) is applied to the disc substrate 15. The decelerating voltage is a negative voltage having magnitude by which the electron beam can be decelerated. A voltage source 60 is provided to apply the decelerating voltage and an electrostatic chucking voltage for retaining the disc substrate 15 on the turntable 16.

First Embodiment

A first embodiment of the master disc producing apparatus 10 according to the invention will be described below. In the master disc producing apparatus 10 having the above basic configuration, it is necessary to adjust the electron beam before the disc substrate 15 is actually irradiated with the electron beam to produce the master disc. Specifically, the optical system such as the objective lens 47 in the electron beam emission head 40 is adjusted to perform the focus adjustment (hereinafter referred to as "beam adjustment") of the electron beam spot formed on the disc substrate 15. In order to correctly form the concentric or radial fine pattern on the disc substrate, the rotating center of the turntable 16 is detected to match the drawing origin of the electron beam with the rotating center of the turntable 16, i.e., with the polar coordinate origin (hereinafter referred to as "rotating center adjustment").

Figure 2A:
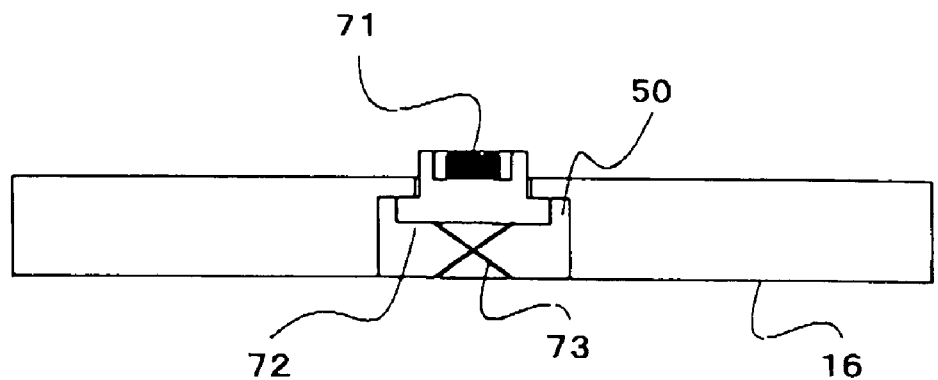
FIGS. 2A to 2C are sectional views showing a turntable according to first and second embodiments.

In the invention, in order to perform those adjustments, the beam adjustment sample is provided near the center of the turntable 16, more properly in the range including the rotating center. FIG. 2A is a sectional view showing the turntable 16 according to the first embodiment, in which the disc substrate 15 is not placed on the turntable 16. A recess portion 50 is formed at the center of the turntable 16. A sample stage 72 retaining a beam adjustment sample 71 (hereinafter also simply referred to as "sample 71") is accommodated in the recess portion 50 while the sample stage 72 is supported by a sample stage support mechanism 73. The sample stage support mechanism 73 is formed as an elevating mechanism which moves the sample stage 72 in a vertical direction of FIG. 2A. Since the sample stage support mechanism 73 is fixed to the turntable 16, the sample stage 72 is also rotated when the turntable 16 is rotated. The sample stage 72 has a recess portion on the side where the disc substrate 15 is placed, and the sample 71 is fixed in the recess portion. The sample 71 is fixed within the range including the rotating center of the turntable 16.

Figure 3A:
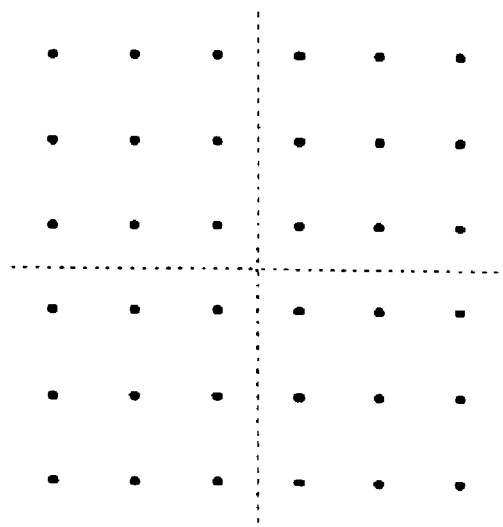
FIGS. 3A and 3B show an example of a beam adjustment sample.

It is desired that the sample 71 can be applied to both the beam adjustment and the rotating center adjustment. Specifically, examples of the sample 71 include a sample produced in such a manner that metallic particles such as Au or latex spheres are dispersed on the surface of material having a flat surface enough to reflect the light and then conductive treatment is applied, and a sample produced in such a manner that the patterning of a fine dot array pattern or mesh-shape line shown in FIG. 3A is applied to the material having the flat surface enough to reflect the light and then the conductive treatment is applied thereto. Thus, the sample 71 formed by the conductive pattern having the enough flatness to reflect the light can be used in both the beam adjustment and the rotating center adjustment, and hence it is not necessary that the different samples are separately prepared for the individual adjustment.

The beam adjustment and the rotating center adjustment are performed before the disc substrate 15 is placed on the turntable 16. As shown in FIG. 2A, during the adjustment, the sample stage 72 is raised by the sample stage support mechanism 73 such that the sample 71 is located slightly above an upper surface of the turntable 16. Preferably, the sample stage 72 is positioned such that a sample surface of the sample 71 is substantially matched with the upper surface position of the disc substrate 15 when the disc substrate 15 is placed on the turntable 16. That is, it is preferred that the height of the sample surface of the sample 71 from the turntable 16 is equal to the height of the disc substrate, and that an error between the height of the sample surface from the turntable and a thickness of the disc substrate is set within a focal depth of the electron beam. However, even if the error does not fall within the focal depth of the electron beam, when the sample 71 has a property of reflecting the light, the error can be absorbed by measuring the error by the height detector 24 and controlling the focus drive unit 56 to perform the focus control based on the measured height.

Figure 2B:
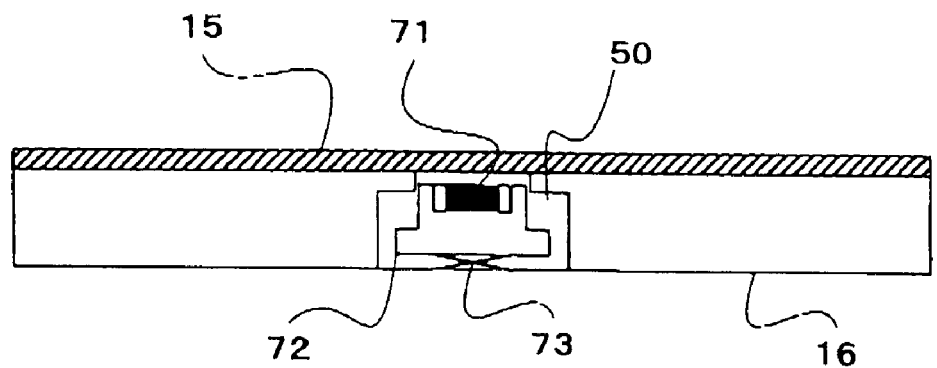

On the other hand, when the beam adjustment and the rotating center adjustment are completed, the disc substrate 15 is placed on the turntable 16 to draw the pattern by the electron beam. FIG. 2B is a sectional view showing the turntable 16 when the disc substrate 15 is placed. When the disc substrate 15 is placed on the turntable 16, the sample stage 72 is lowered in the recess portion 50 by the sample stage support mechanism 73 to the position where the sample stage 72 does not interrupt the placement of the disc substrate 15, i.e., to the position below the upper surface of the turntable 16.

Figure 4:
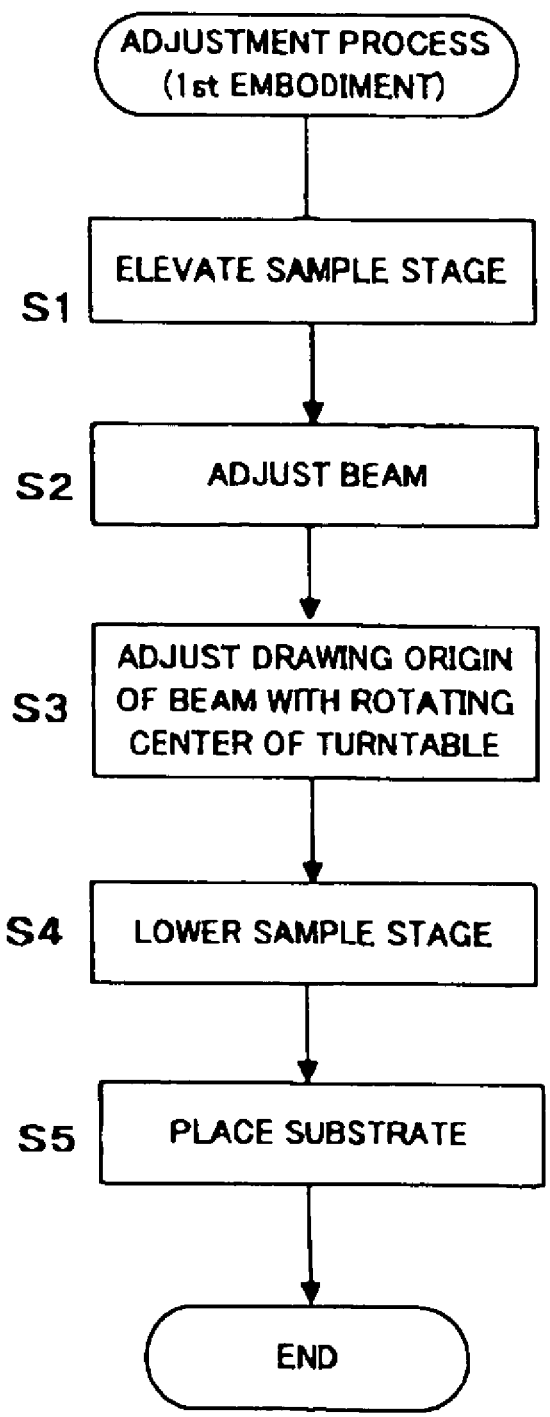
FIG. 4 is a flowchart showing an adjustment process according to the first embodiment.

Next, the adjustment process including the beam adjustment and rotating center adjustment will be described. FIG. 4 is a flowchart showing an adjustment process in the first embodiment. In the following description, it is assumed that the dot pattern sample shown in FIG. 3A is used as the sample 71.

As shown in FIG. 2A, the sample stage support mechanism 73 is adjusted to raise the sample stage 72 until the sample surface of the sample 71 substantially projects, by the thickness of the disc substrate 15, from the upper surface of the turntable 16 (Step S1).

Then, the beam adjustment is performed such that the electron beam is focused onto the sample surface of the sample 71. Specifically, the electron beam is scanned while being irradiated on the sample surface, and the sample surface is observed by displaying a scanning electron microscope image (hereinafter referred to as "SEM image") obtained from secondary electron or reflection electron information. At this point, the turntable 16 and the stage 18 are kept standing still. The SEM image of the sample surface becomes the dot pattern image as shown in FIG. 3A When the focal point of the electron beam is not located on the sample surface, one dot shape of the dot pattern becomes defocused or a large elliptical shape by astigmatism. On the other hand, when the focal point of the electron beam is located on the sample surface, one dot shape of the dot pattern becomes a round shape having a minimum area. Therefore, the SEM image of the sample surface is observed to adjust the optical system in the electron beam emission head 40 such as the objective lens 47, the focus adjustment lens 46 and the astigmatism corrector such that the resolution becomes the optimum (Step S2).

Figure 3B:
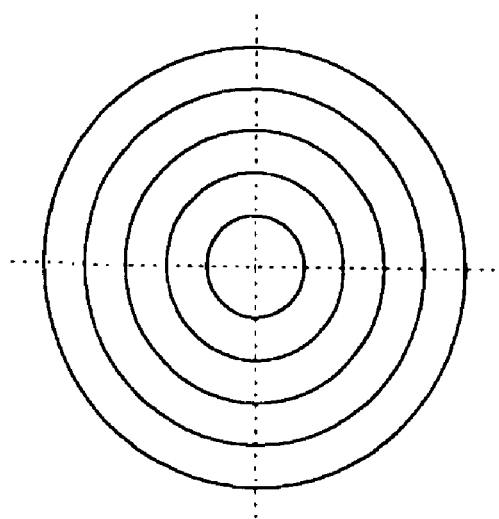

Then, the rotating center adjustment is performed. That is, the drawing origin of the electron beam is matched with the rotating center of the turntable 16. Specifically, while the turntable 16 is rotated, the sample surface is irradiated with the electron beam to scan the sample surface, and the observation is performed by displaying the SEM image. In this embodiment, since the dot pattern shown in FIG. 3A is used as the sample 71, the concentric SEM image shown in FIG. 3B is observed during the rotation of the turntable 16. The position of the stage 18 and the deflection amount of electron beam are adjusted such that the center of the concentric circle is located in the center of the visual field of the electron microscope. At this point, since the stage 18 can be moved only in the X-direction of FIG. 1, the positioning in the X-direction is mainly performed by the movement of the stage 18, and the positioning in the Y-direction (i.e., the direction perpendicular to the moving direction of the stage 1B) is performed by controlling the deflection amount of electron beam with the electron beam emission head 40 or by moving the electron beam emission head 40.

Specifically, the low-magnification SEM image is initially displayed, and the position of the stage 18 is controlled such that the electron beam is located at the center position of the concentric image. Then, the electron beam is deflected by controlling the beam deflection drive unit 55, and thereby a residual error component is corrected at the rotating center position of the turntable 16. The above operation is repeated by magnifying the SEM image, and the drawing origin of the electron beam is matched with the rotating center of the turntable 16 (Step S3).

When the beam adjustment and the rotating center adjustment are completed, the sample stage 72 is lowered to the position where the sample stage 72 does not interrupt the placement of the disc substrate 15 on the turntable 16 as shown in FIG. 2B (Step S4).

Next, the disc substrate 15 to which photoresist is coated is placed on the turntable 16 such that preferably the rotating center of the turntable 16 is matched with the center of the disc substrate 15 (Step S5). Then, the exposure is performed by the electron beam drawing to produce the master disc.

Thus, according to this embodiment, since the sample stage can be lowered in the turntable 16 to the position where the sample stage does not interrupt the placement of the disc substrate 15 when the disc substrate 15 is placed, the dedicated stage for retaining the beam adjustment sample is not required, and the apparatus can be down sized. Furthermore, since the rotating center adjustment sample is always in the attached state, the rotating center is always adjusted as the apparatus function, and the pattern can accurately be drawn without the deviation of the origin.

Second Embodiment

Next, a second embodiment will be described. The object of the first embodiment is the disc substrate 15 having no center hole. On the other hand, the second embodiment is applied when the disc substrate which is the object of the electron beam drawing has the center hole, and the second embodiment differs from the first embodiment in the turntable structure. In the second embodiment, since the whole configuration except for the turntable structure of the master disc producing apparatus 10 is similar to that of the first embodiment, the description will be omitted.

Figure 2C:
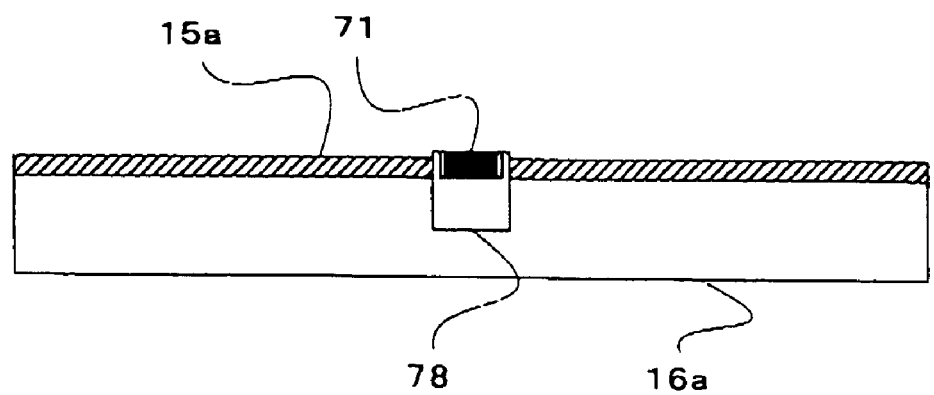

FIG. 2C is a sectional view showing a turntable 16a in the second embodiment. In the second embodiment, a disc substrate 15a has the center hole, and a center boss 78 engaging the center hole of the disc substrate 15a is provided in the upper surface of the turntable 16a. The center boss 78 is also used as the sample stage, and the sample 71 is arranged on the center boss 78. That is, the center boss 78 engaging the disc substrate 15a having the center hole is commonly used with the disc substrate 15a. Specifically, as shown in FIG. 2C, the center boss 78 has a recess portion, and the sample 71 is arranged in the recess portion. At this point, the sample 71 is arranged in the recess portion of the center boss 78 such that the height of the sample surface of the sample 71 from the upper surface of the turntable 16a becomes equal to the thickness of the disc substrate 16a.

In the second embodiment, by the method similar to the first embodiment, the beam adjustment and the rotating center adjustment are performed by the SEM observation of the sample 71. However, since the disc substrate 15a can be retained on the turntable 16a while the center hole of the disc substrate 15a engages the center boss 78, it is not necessary to lower the center boss 78 which also functions as the sample stage. In other words, the beam adjustment and the rotating center adjustment can be performed even after the disc substrate 15a is placed on the turntable 16a.

Accordingly, in the second embodiment, the apparatus can be downsized, and the beam adjustment and the rotating center adjustment can accurately be performed by utilizing the sample 71 supported by the turntable 16a.

Third Embodiment

Figure 5A:
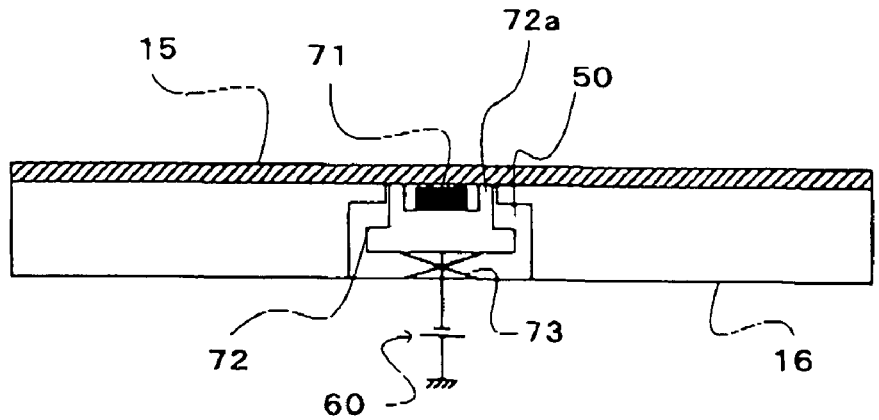
FIGS. 5A to 5C are sectional views showing a turntable according to a third embodiment.

Then, a third embodiment will be described. In the third embodiment, the sample stage is also used as an armature (electrode) which applies the decelerating voltage of the electron beam. FIG. 5A is a sectional view showing the turntable 16 according to the third embodiment, and the sample stage 72 is used as an applied voltage electrode in the turntable 16 of FIG. 5A. Specifically, the sample stage 72 is made of a conductive material such as a metallic material, and the electron beam decelerating voltage is applied from the voltage source 60. While the disc substrate 15 is placed on the turntable 16, an upper end portion 72a of the sample stage 72 is in contact with the lower surface of the disc substrate 15 as shown in FIG. 5A, and the sample stage 72 applies the electron beam decelerating voltage supplied from the voltage source 60 to the disc substrate 15. The sample stage support mechanism 73 supports the sample stage 72 at the position where the upper end portion 72a of the sample stage 72 is in contact with the lower surface of the disc substrate 15 with proper pressure, while the disc substrate 15 is placed on the turntable 16.

Figure 6:
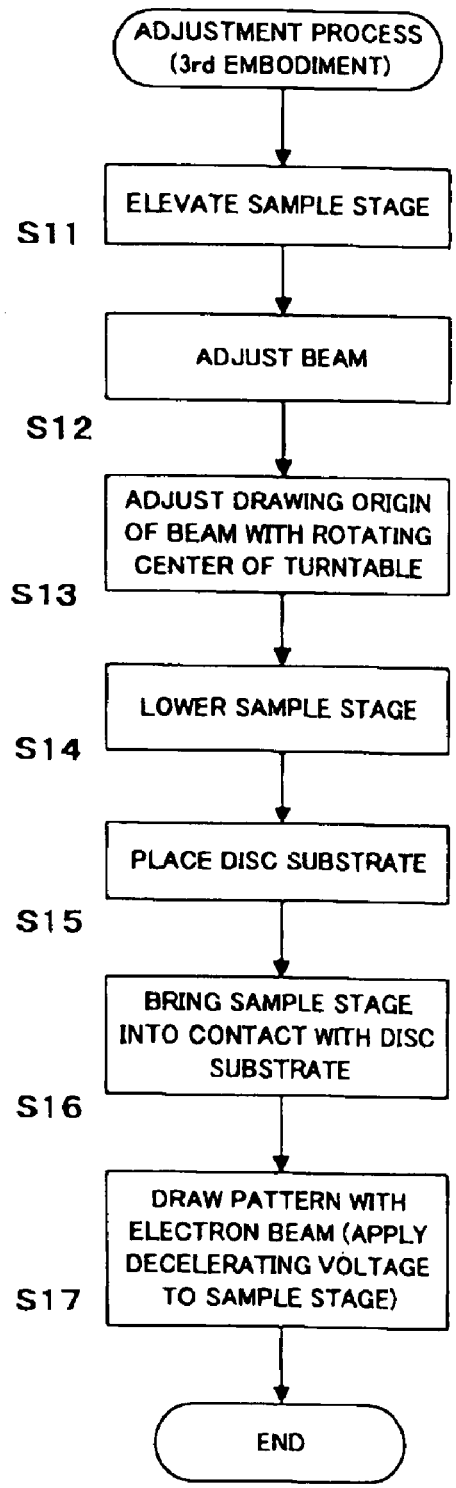
FIG. 6 is a flowchart showing an adjustment process according to the third embodiment.

FIG. 6 is a flowchart showing an adjustment process in the third embodiment. Similarly to the first embodiment, the adjustment process includes the beam adjustment and the rotating center adjustment. In the adjustment process of the third embodiment, since steps S11 to S15 are similar to steps S1 to S5 of the first embodiment, the description will be omitted.

After steps S11 to S15, the sample stage support mechanism 73 is driven to raise the sample stage 72 again, and the sample stage support mechanism 73 is stopped at the position where the upper end portion 72a of the sample stage 72 comes into contact with the lower surface of the disc substrate 15 as shown in FIG. 5A (Step S16).

Next, the drawing by the electron beam is performed (Step S17). At this time, the voltage source 60 supplies the decelerating voltage to the sample stage 72 and disc substrate 15, which are electrically connected to each other, such that the sample stage 72 and disc substrate 15 become the negative electrode. Therefore, the disc substrate 15 is negatively charged, and the electrons in the electron beam irradiated on the principal surface of the disc substrate 15 are decelerated.

Thus, in addition to the effect of the first embodiment, in the third embodiment, the sample stage 72, on which the sample 71 is placed to perform the beam adjustment and the rotating center adjustment, is also used as the electrode for applying the electron beam decelerating voltage. Accordingly, it is not necessary that the decelerating voltage electrode be provided independently of the sample stage 72, so that the apparatus configuration can be simplified.

Next, a modification of the third embodiment will be described.

Figure 5B:
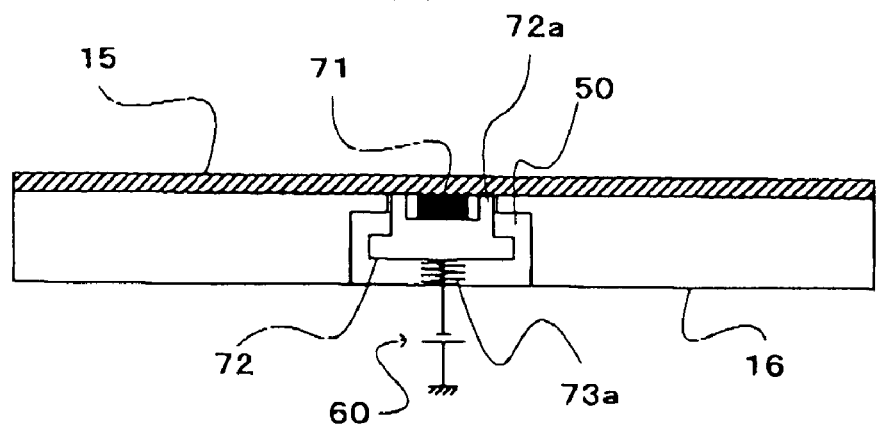

FIG. 5B shows a modification of the third embodiment, in which the sample stage support mechanism is formed by a spring 73a. An upper end of the spring 73a which functions as the sample stage support mechanism is fixed to the bottom surface of the sample stage 72, and a lower end of the spring 73a is fixed to the bottom surface of the recess portion 50 formed on the turntable 16. Therefore, the spring 73a biases the sample stage 72 against the lower surface of the disc substrate 15 with proper pressure. This enables the upper end portion 72a of the sample stage 72 to be continuously in contact with the lower surface of the disc substrate 15 by the elastic force of the spring 73a, even if the disc substrate 15 is vertically swung by the rotation of the motor.

Figure 5C:
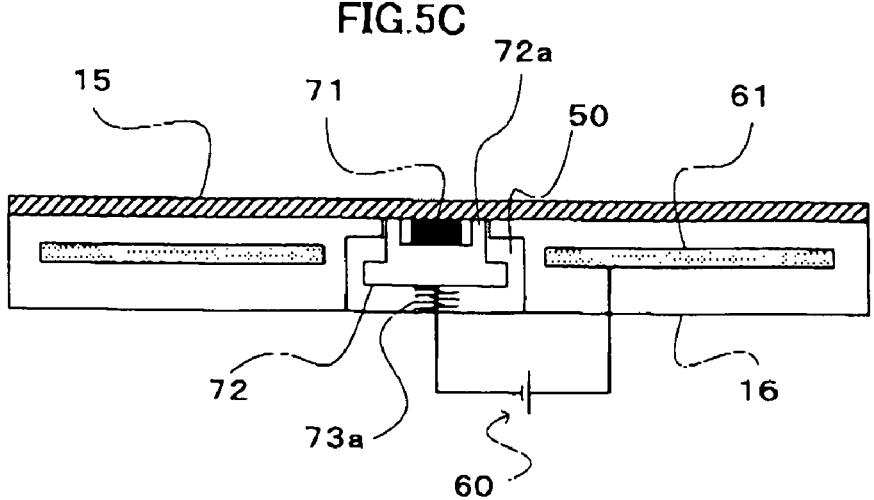

FIG. 5C shows another modification of the second embodiment, in which the sample stage is used as the electrostatic chucking electrode. It is necessary that the disc substrate 15 be firmly fixed to the turntable 16 while the pattern is drawn by the electron beam. Therefore, as described above, the electrostatic chucking system, electrostatically adsorbing the disc substrate 15 and turntable 16 by the Coulomb force is used as the method of firmly fixing the disc substrate 15 to the turntable 16. In the third embodiment, the sample stage 72 is used as the electrode which applies the electron beam decelerating voltage. Alternatively, as shown in FIG. 5C, an inner electrode 61 is embedded in the turntable 16, and the positive voltage is applied to the inner electrode 61 to form the positive electrode. This allows the disc substrate 15 and the turntable 16 to be electrostatically adsorbed.

INDUSTRIAL APPLICABILITY

The invention can be applied to the rotary stage type electron beam drawing apparatus in which the fine rotationally symmetrical pattern (for example, the spiral pattern, the concentric pattern, and the radial pattern) is drawn on the master disc such as the optical disc and the magnetic disc.

The invention claimed is:

1. An electron beam drawing apparatus comprising:
   an electron beam emitting unit which emits an electron beam;
   a rotary stage which rotatably supports a turntable comprising a drawing object retaining surface;
   a sample stage disposed in a range which includes a rotating center of the turntable;
   an adjustment sample which is supported by the sample stage; and
   an adjustment unit configured to perform both beam adjustment and rotating center adjustment based on observations of the adjustment sample.

2. The electron beam drawing apparatus according to claim 1, further comprising a sample stage support mechanism configured to movably support the sample stage in a direction perpendicular to the drawing object retaining surface.

3. The electron beam drawing apparatus according to claim 1, further comprising a sample stage support mechanism configured to move the sample stage below the drawing object retaining surface.

4. The electron beam drawing apparatus according to claim 3, wherein the turntable has a recess portion on the drawing object retaining surface near the rotating center, and
   the sample stage support mechanism comprises an elevating mechanism which is provided in the recess portion and is configured to raise and lower the sample stage.

5. The electron beam drawing apparatus according to claim 1, wherein the sample stage has conductivity, wherein a sample stage support mechanism supports the sample stage while the sample stage is in contact with a drawing object retained by the turntable on the drawing object retaining surface, and
   the sample stage support mechanism further comprises voltage applying means for applying a voltage to the sample stage.

6. The electron beam drawing apparatus according to claim 5, wherein the sample stage support mechanism biases the sample stage against a drawing object retained by the turntable on the drawing object retaining surface.

7. The electron beam drawing apparatus according to claim 1, wherein the adjustment sample has conductivity.

8. The electron beam drawing apparatus according to claim 1, wherein the adjustment sample comprises particles dispersed therein, the particles being metallic particles or latex spheres.

9. An electron beam drawing apparatus according to claim 1, wherein the adjustment sample has a fine structure on a surface thereof, the fine structure having enough flatness to reflect light and comprising dispersed particles or a dot array pattern or a mesh shape line pattern.

10. An electron beam apparatus comprising:
    a turntable comprising a substrate supporting surface;
    an electron beam emitter;
    an adjustment sample support configured to support an adjustment sample, the adjustment sample support arranged in correspondence with a central portion of the turntable; and
    a processing system configured to control both electron beam focus adjustment and electron beam position adjustment based on image data produced when an electron beam from the electron beam emitter is incident on a surface of an adjustment sample supported by the adjustment sample support and to control applying an electron beam to a substrate supported on the substrate supporting surface based, at least in part, on the electron beam focus adjustment and the electron beam position adjustment.

11. The electron beam apparatus according to claim 10, wherein the adjustment sample support is configured for movement between a first position for electron beam focus adjustment and electron beam position adjustment and a second position for applying an electron beam to a substrate supported on the substrate supporting surface.

12. The electron beam apparatus according to claim 11, wherein the adjustment sample support is biased so that at least a portion thereof contacts a substrate supported on the substrate supporting surface.

13. The electron beam apparatus according to claim 10, wherein the adjustment sample support comprises a conductive material and is configured to apply a voltage to a substrate supported on the substrate supporting surface.

14. The electron beam apparatus according to claim 10, wherein the image data corresponds to a pattern formed on the surface of the adjustment sample.

15. The electron beam apparatus according to claim 10, wherein the image data corresponds to a dot array pattern formed on the surface of the adjustment sample.

16. The electron beam apparatus according to claim 10, wherein the image data corresponds to a mesh shape line pattern formed on the surface of the adjustment sample.

17. The electron beam apparatus according to claim 10, wherein the adjustment sample support comprises a boss configured to engage an opening of a substrate supported on the substrate supporting surface of the turntable.

18. The electron beam apparatus according to claim 10, wherein the adjustment sample support is arranged in correspondence with an opening in the central portion of the turntable.

* * * * *